United States Patent [19]
Asada et al.

[11] Patent Number: 4,941,919
[45] Date of Patent: Jul. 17, 1990

[54] COPPER-BASED SLIDING MATERIAL AND METHOD FOR PRODUCING THE SAME

[75] Inventors: Eiji Asada; Takashi Tomikawa; Tatsuhiko Fukuoka, all of Toyota, Japan

[73] Assignee: Taiho Kogyo Co., Ltd., Toyota, Japan

[21] Appl. No.: 206,789

[22] Filed: Jun. 15, 1988

[30] Foreign Application Priority Data

Jun. 17, 1987 [JP] Japan .................................. 62-149270

[51] Int. Cl.$^5$ .............................................. C22C 29/12
[52] U.S. Cl. ........................................ 75/235; 75/247; 75/243; 75/951; 419/11; 419/19; 419/32; 419/35; 419/36; 427/217; 427/427; 428/552
[58] Field of Search ................. 75/235, 247, 243, 951; 419/11, 19, 32, 35, 36; 427/217, 427; 428/552

[56] References Cited

U.S. PATENT DOCUMENTS

| | | | |
|---|---|---|---|
| 4,615,733 | 10/1986 | Kubo et al. | 75/229 |
| 4,707,184 | 11/1987 | Hashiguchi et al. | 75/228 |
| 4,871,394 | 11/1988 | Baker et al. | 75/232 |

FOREIGN PATENT DOCUMENTS

| | | |
|---|---|---|
| 56-41348 | 4/1981 | Japan . |
| 60-106932 | 6/1985 | Japan . |
| 62-54003 | 3/1987 | Japan . |
| 6167736 | 4/1988 | Japan . |

OTHER PUBLICATIONS

Metals Handbook, 8th Edition, ASM Taylor Lyman Ed.

*Primary Examiner*—Stephen J. Lechert, Jr.
*Assistant Examiner*—Nina Bhat
*Attorney, Agent, or Firm*—Armstrong, Nikaido, Marmelstein, Kubovcik & Murray

[57] ABSTRACT

The sintered sliding material according to the present invention consists of from 0.1 to 10% by of graphite, from 1 to 7% by of alumina, and balance of copper, and occasionally at least one member selected from the group consisting of from 1 to 10% of Sn and from 1 to 30% of Pb, and/or not more than 1% of P, and includes the alumina dispersed in the copper matrix. The alumina is held by the copper matrix so that the particles of alumina are not separated from the material during sliding under a boundary lubricating condition.

34 Claims, 2 Drawing Sheets

COPPER-BASED SLIDING MATERIAL AND METHOD FOR PRODUCING THE SAME

BACKGROUND OF INVENTION

1. Field of Invention

The present invention relates to copper-based sliding material and method for producing the same. More particularly, the present invention relates to an improvement in the sintered sliding material consisting essentially of copper, graphite and alumina.

2. Description of Related Arts

Such alloys as bronze, lead bronze and kelmet have heretofore been used as the copper-based sliding material. Every one of these materials exhibits the sliding characteristics only under the condition where abundant lubricating oil is present. The sliding characteristics of these alloys are unsatisfactory under a severe lubricating condition, i.e., the boundary lubricating condition, so that such damages as the wear and seizure occur in a short period of time on the sliding surface. Accordingly, the resin bearings, representative of which is the polytetrafluoroethylene, and bearings made of metal and graphite, the latter being embedded on the sliding surface of the former, are used, since the sliding characteristics of these materials are exhibited under the boundary lubricating condition. However, the sliding characteristics of these materials are poor from the view points of wear-resistance and seizure resistance. Accordingly, the present inventors paid attention to Japanese Unexamined Patent Publications Nos. 61-67,736, and 60-106,932, which propose the sliding material consisting essentially of copper, graphite and alumina, and which disclose the reduction in coefficient of friction due to graphite and the increase in wear-resistance due to alumina. The present inventors thus studied the sliding characteristics of these materials.

It turned out as a result of the investigation present inventors that, when the copper-graphite-alumina series material produced by an ordinary sintering method is subjected to the wear-resistance test and seizure-resistance test under the boundary lubricating condition, alumina is separated from the sliding surface to deteriorate the sliding characteristics.

SUMMARY OF THE INVENTION

It is therefore an object of the present invention to provide a copper-graphite-alumina series sintered sliding material having improved bearing characteristics, particularly wear-resistance and seizure-resistance.

It is another object of the present invention to further improve the sliding characteristics by means of adding an additive(s) to the above mentioned copper-graphite-alumina series sintered sliding material.

It is a further object of the present invention to provide a method for producing copper-graphite-alumina series sintered sliding material having improved sliding characteristics.

It is also an object of the present invention to provide a method for producing the copper-graphite-alumina series sintered sliding material mentioned above.

In accordance with the objects of the present invention, there is provided a sintered sliding material consisting of from 1 to 10% by weight of graphite, from 0.1 to 7% by weight of alumina, and balance of copper as a matrix, characterized in that the alumina is dispersed in the copper matrix.

There is also provided a sintered sliding material consisting of from 1 to 10% by weight oil graphite, from 0.1 to 7% by weight of alumina, at least one member selected from the group consisting of from 1 to 10% by weight of Sn and from 1 to 30% by weight of Pb, and balance of copper as a matrix, characterized in that the alumina is dispersed in the copper matrix.

There is also provided a sintered sliding material consisting of from 1 to 10% by weight of graphite, from 0.1 to 7% by weight of alumina, at least one member selected from the group consisting of from 1 to 10% by weight of Sn and from 1 to 30% by weight of Pb, not more than 1% by weight of P, and balance of copper as a matrix, characterized in that the alumina is dispersed in the copper matrix.

A method for producing the above mentioned inventive sliding material comprises: an alumina-dispersing step for blending an alumina powder into copper powder and dispersing the alumina powder in the matrix of copper, thereby forming a copper-alumina blended powder; a graphite-blending step for mixing graphite powder with the copper-alumina blended powder; a spraying step for spraying the graphite-mixed powder on a substrate; and, a sintering step for sintering the mixed powder on the substrate to bond the mixed powder and substrate.

Another method for producing the above mentioned inventive sliding material comprises: an alumina-dispersing step for blending an alumina powder into copper powder and dispersing the alumina powder in the matrix of copper, thereby forming a copper-alumina blended powder; an alloying step for blending at least one powder selected from the group consisting of tin, lead, phosphorous, and an alloy of copper with at least one of tin, lead, and phosphorous, with the copper-alumina blended powder, thereby obtaining a composite powder; graphite-blending step for mixing graphite powder with the composite powder, thereby obtaining a graphite-mixed powder; a spraying step for spraying the graphite-mixed powder on a substrate; and, a sintering step for sintering the mixed powder on the substrate to bond the mixed powder and substrate.

DESCRIPTION OF PREFERRED EMBODIMENTS

The composition of sliding materials according to the present invention is first described.

The graphite has a lubricating effect and enhances the seizure resistance. When the amount of graphite is less than 1% by weight, the seizure resistance under boundary lubricating condition is enhanced only slightly. On the other hand, when the amount of graphite is more than 10% by weight, the proportion of direct bonding between the copper particles becomes small in the sintered material, with the result that the copper particles tend to be surrounded by the graphite film and be thus isolated from each other. In this case, the strength of matrix of sliding material is lessened, with the result that the wear-resistance is lessened. The amount of graphite is preferably from 1 to 5% by weight, more preferably from 1 to 3% by weight.

Alumina is dispersed as the fine Particles in the sintered material and enhances the wear resistance. When the amount of alumina is less than 0.1% by weight, the wear-resistance is enhanced only slightly. On the other hand, when the amount of alumina is more than 7% by weight, the abrasive wear takes place, with the result that not only is the sintered material worn out due to the alumina separation, but also the separated alumina particles cause the opposite member to wear out. In addition, the seizure resistance becomes poor. The amount of alumina is preferably from 1 to 7% by weight, more preferably from 1.5 to 5% by weight. The amount of alumina is preferably from 1.5 to 3% in the light of comprehensive sliding characteristics, including the wear-characteristic of the opposed member. The balance of above composition is copper and impurities.

Next, the structure of sintered sliding material according to the present invention is described.

The present inventors made researches for the reason that, in the conventional copper-graphite-alumina series sintered material, alumina particles separate from the sliding surface under the boundary lubricating condition, and confirmed the following. That is, most of the alumina particles are present in the boundaries of copper particles and graphite particles of the sintered material, and the particles separated during the slidable contact with the opposite member are those which have been present in the boundaries. The present inventors then made researches for a sintering method, in which the alumina is surely incorporated in the copper particles. The present inventors discovered that the wear-resistance and seizure-resistance under the boundary lubricating condition is enhanced by means of incorporating the alumina particles in the copper particles. The characterizing structure of sliding material according to the present invention is described with reference to FIG. 1 which schematically illustrates the structure.

BRIEF DESCRIPTION OF DRAWINGS

In FIG. 1, 1 indicates the copper particles, 2 indicates graphite present in the grain boundaries of copper particles 1, 3 indicates alumina particles included in the copper particles 1, and 4 indicates the sliding surface.

Figure 1:
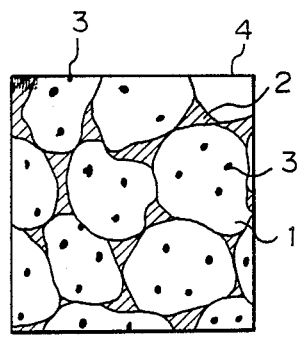
FIG. 1 is a schematic drawing of the structure of sliding material according to the present invention.

The copper particles 1 are matrix which imparts to the sliding material the strength and heat-resistance. The graphite oil is solid lubricant and is present around copper particles 1. The parts of graphite exposed on the sliding surface 4 cause the decrease in the friction with respect to the opposed member. The alumina particles 3 are incorporated in the copper particles 1 and enhance the wear-resistance. If the alumina particles 3 are held in the graphite 2, the alumina particles 3 alone or alumina particles together with the graphite 2 are liable to separate. The alumina particles 3, which are held in the copper particles 1, are strongly held by the copper particles and are not separated from the sliding surface, notwithstanding their exposure to the sliding surface. A commercially available Ni-coated alumina can be used as the alumina particles 1. Since the Ni, which is present over the surfaces of Ni-coated alumina, has a good compatibility with the copper, the Ni-coated alumina enhances the sintering property. However, since Ni has a lower hardness than alumina free of metallic coating, the wear-resistance of sintered material containing the Ni-coated alumina tends to be lower than that containing the alumina. It is expected that the Ni-coated alumina is stably held by the copper matrix over a long period of time and improves the wear-resistance, when it is evaluated for a long period of time. Incidentally, Cu and Al, which is spattered or vapor-deposited on the alumina particles, are expected to have the same effects as Ni has.

The sliding material according to the present invention may further contain an additive(s), i.e., at least one member selected from the group consisting of not more than 10% by weight of Sn and 30% by weight of Pb. When the contents of Sn and Pb exceed 10% by weight and 30% by weight, respectively, the strength of sliding material is lessened. A preferable minimum content of Sn and Pb is 1% by weight. Wear-resistance enhancing additive, i.e., P(phosphorus), may further be added in an amount of not more than 1% by weight, preferably from 0.001 to 1% by weight. The above additives may be added into the sliding material in the form of either alloy with copper, alone, or alloy with each additive. There is no difference in the effects of additives depending upon their adding methods. However, there is a limitation in the content of additives depending upon the adding methods.

A method for producing the sliding material according to the present invention is hereinafter described.

A method for dispersing the alumina particles in the copper-based particles (matrix) is first described. In the copper-based sintered material, atomized powder is ordinarily used as the copper (alloy) powder. This powder has a spherical shape and an isotropic property. The atomized powder has therefore such advantages that it easily provides uniform products and facilitates the production of alloy powder. When the atomized powder is mixed with the alumina and then sintered, the alumina is dispersed outside the copper (alloy) particles, i.e., in the grain boundaries of the copper (alloy) particles. In order to disperse the alumina particles in the copper-based metallic particles (matrix), the copper particles must be electrolytically deposited ones, having such shapes as a dendrite shape, an elongated shape, in which a number of granules are connected, or the like. The electrolytically deposited copper powder having such a shape is commercially available. The powder having an intricated shape may be used as the starting material powder, even if the powder is not one of the forementioned commercially available ones. A desired distribution is obtained by means of blending the electrolytic deposited powder with the alumina particles for 24 hours or more by means of a blending and mixing machine, e.g., a ball mill or a mechanical machine made of the copper-mixing and blending parts. If the stirring time is short, the alumina is dispersed in the boundaries, as is the case of atomized particles. When the graphite is subjected to the above mentioned stirring for a long period of time, 24 hours or more, the graphite floats on the mixture because of the low specific gravity of the graphite powder, with the result that uniform mixing is disadvantageously not attained. The graphite should therefore be mixed with the copper and alumina particles which have already been mixed with one another.

Incidentally, the presently commercially available copper particles are pure copper particles. The additives, such as Sn, Pb, and P, should therefore be added as the powder is separate from the copper particles. When the additives are blended with the copper particles at the same time as the alumina-blending process, the additives are oxidized somewhat. The additives are therefore desirably blended with the copper particles subsequent to the alumina-blending step. These additives may be included in the atomized copper particles. However, in this case, at least 90% by weight of the copper particles should be electrolytically deposited copper particles, thereby preventing decrease in the proportion of copper particles (electrolytically deposited copper particles) capable of holding the alumina particles therein.

Subsequent to the blending of the respective ingredients as described above, the sintering is carried out. The sintering condition is an ordinary one, for example a temperature of from 750° to 900° C.

In the resultant sintered body, the graphite is densely filled in the grain boundaries of matrix. Occasionally, a small amount of the alumina is filled in the grain boundaries. Virtually, no vacancies are present in the grain boundaries due to filling by the above described non-metallic components.

According to an embodiment of the present invention, the sintered articles may be impregnated with the lubricating oil, by means of dipping the sintered articles in such oil, as turbine oil, machine oil, engine oil, ice-machine oil, and the like. The oil is absorbed into the graphite, with the result that oil is supplied to the sliding surface between the sliding material and the opposed member to further improve the sliding characteristics. The highest amount of oil is limited by the saturation amount of oil in the graphite and is approximately 5% by weight.

In the above described Japanese Unexamined Patent Publication Nos. 61-87736 and 60-106932 which propose copper-graphite-alumina sintered materials, an attempt is made to attain a compatibility of a high coefficient of friction and an excellent wear-resistance, while avoiding seizure. These publications are common in the present invention in the points that excellent seizure-resistance and wear-resistance are attempted. The testing lubricating condition in these publications are dry or water-spraying, and the application of the materials of these publications are those where a high coefficient of friction is required.

The present invention is further explained with reference to the examples.

EXAMPLE 1

The powder of electrolytically deposited copper (dendrite powder, trade name CE-7 produced by Fukuda Seisakusho, under 100 mesh), alumina powder ($\gamma$-alumina, average diameter- 5 $\mu$m, is trade name-WA#3000 produced by Fujimi Seisakusho), and graphite powder (synthetic graphite, average particle diameter—10 $\mu$m) were weighed to provide the compositions given in Table 1. The electrolytically deposited powder and alumina powder were first blended by a ball mill for a period of 24 hours. The resultant powder was then mixed with the graphite powder by means of a blender for 30 minutes and further blended with an appropriate amount of organic moulding agent. The resultant powder was then compression-shaped under a pressure of 5 ton/cm² and the resultant green compact was sintered at 900° C. for 1 hour in H₂ atmosphere. The resultant sintered body was sized at a pressure of approximately 5 ton/cm² to obtain samples 20×30×10 mm in size.

The samples were subjected to the wear-resistance test and seizure-resistance test under the following conditions.

Wear-resistance test

| Wear-resistance test |
| --- |
| A flat disc type friction and wear testing machine |
| Sliding speed: 0.21 m/sec(100 rpm) |
| Lubricating oil: kerosene oil (dipping) |
| Opposed member: Hardened S55C (Hv 500–600) |
| Roughness of shaft: 0.8 ± 0.1 $\mu$m |
| Roughness of bearing: 1–2 $\mu$m |
| Load: 10 kg/cm² |

Seizure resistance test

| Seizure resistance test |
| --- |
| A pin disc type thrust tester |
| Sliding speed: 4 m/sec(500 rpm) |
| Lubricating oil: kerosene oil (supplying oil by a pad) |
| Opposed member: Hardened S55C (Hv 500–600) |
| Roughness of shaft: 0.8 ± 0.2 $\mu$m |
| Roughness of bearing: 1–2 $\mu$m |
| Load: successive increase by 40, 20, 60, and 20 kg/15 minute |

TABLE 1

| Samples | Composition Cu | Gr | Alumina | Sn | Pb | P | Wear Amount (mm³) | Seizure Load (kg) |
| --- | --- | --- | --- | --- | --- | --- | --- | --- |
| 1 | Bal | 1 | 1 | — | — | — | 0.350 | 160 |
| 2 | Bal | 1 | 6 | 1 | — | — | 0.076 | 160 |
| 3 | Bal | 2 | 2 | — | 30 | — | 0.163 | 180 |
| 4 | Bal | 2 | 4 | — | — | — | 0.038 | 180 |
| 5* | Bal | 2 | 4 | — | — | — | 0.115 | 160 |
| 6 | Bal | 3 | 3 | 3 | — | — | 0.031 | 240 |
| 7 | Bal | 3 | 5 | 5 | 1 | 1 | 0.022 | 280 |
| 8 | Bal | 4 | 1 | — | — | — | 0.043 | 220 |
| 9 | Bal | 4 | 4 | 10 | — | — | 0.018 | 300 |
| 10 | Bal | 5 | 3 | — | — | 0.005 | 0.025 | 280 |
| 11 | Bal | 5 | 7 | — | — | — | 0.012 | 260 |
| 12 | Bal | 6 | 4 | 8 | 15 | — | 0.049 | 300 |
| 13 | Bal | 6 | 2 | — | — | — | 0.062 | 280 |
| 14 | Bal | 7 | 5 | 1.5 | — | — | 0.055 | 280 |
| 15 | Bal | 7 | 6 | 3 | — | — | 0.063 | 240 |
| 16 | Bal | 8 | 3 | — | — | — | 0.086 | 260 |
| 17 | Bal | 8 | 1 | 4 | — | 0.05 | 0.238 | 240 |
| 18 | Bal | 9 | 7 | — | — | — | 0.145 | 200 |
| 19 | Bal | 9 | 4 | 1 | — | 0.1 | 0.212 | 220 |
| 20 | Bal | 10 | 6 | — | 5 | 0.001 | 0.380 | 200 |
| 21 | Bal | 10 | 2 | 3 | — | — | 0.416 | 220 |
| 22 | Bal | 4 | 0.1 | — | — | — | 0.380 | 160 |
| 23* | Bal | 4 | 4 | 10 | — | — | 0.052 | 200 |
| 24* | Bal | 5 | 7 | — | — | — | 0.045 | 180 |
| Comp1* | Bal | — | 4 | — | 23 | — | 0.430 | 80 |
| Comp2* | Bal | — | — | 3 | 24 | — | 0.506 | 160 |
| Comp3* | Bal | 6 | — | 10 | — | — | 0.723 | 140 |

The atomized powder is used in the asterisked (*) Samples 5, 23, 24 and Comp 1–3.

Comp 2 corresponds to conventional kelmet-based sintered sliding material and its wear-resistance under the boundary lubricating condition is extremely low. In Comp 1, the alumina particles are dispersed but much of the alumina particles are dispersed in the Pb phases. The alumina particles are therefore not effective for enhancing the wear-resistance. In addition, the seizure-resistance is seriously lessened due to a large amount of Pb. In Comp 3, the effects due to graphite addition is not appreciable, since the graphite is effective for decreasing the coefficient of friction but is not effective for improvements in wear-resistance and seizure-resistance.

When comparing Comparative Sample No. 5 with inventive Sample No. 4, it is understood that the alumina-dispersion in the copper matrix leads to an increase in the wear-resistance as high as 4 times and an increase in the wear-resistance as high as 50%. Samples Nos. 9 and 11 correspond to the compositions where the best wear-resistance and seizure-resistance are attained. When the atomized powder was used to obtain the compositions of these samples in the comparative samples, the seizure-resistance was reduced by approximately a half and the wear-resistance was reduced by approximately ¼ as shown in Sample Nos. 23 and 24.

Figure 2:
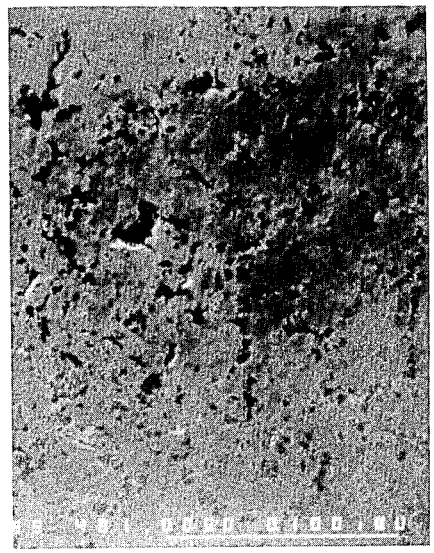
FIG. 2 is a metal microscope photograph of Sample 4 of Example 4.
Figure 3:
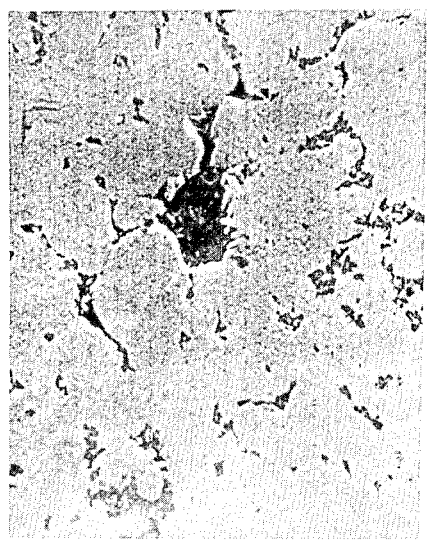
FIG. 3 is a metal microscope photograph of Sample 5 of Example 1.

FIGS. 2 and 3 show the structure of Samples 4 and 5, respectively. In FIG. 3, the grain boundaries and the intergrains are distinguished from one another, and virtually no dispersed matters are appreciable within the grains. In FIG. 2, the grain boundaries and the intergrains are not clearly distinguished from one another, because a large number of convex dispersed matters are present within the boundaries. The hardness measurement of the structure of grain boundaries reveals an extremely low hardness thereof, which indicates the presence of graphite in the grain boundaries. The analysis of dispersed matters in grain boundaries by an X-ray microanalyzer reveals that they are graphite.

EXAMPLE 2

Instead of the alumina of Sample No. 4 of Example 1, the Ni-coated alumina was used. The seizure resistance was 200 kg and was thus slightly decreased as compared with Example 1.

EXAMPLE 3

Turbine oil was impregnated into Sample 4 by 2%. The seizure-resistance was 200 kg and was slightly increased as compared with Sample 4. However, the wear-amount was 0.009 mm$^3$, which indicates a drastic increase in the wear-resistance.

We claim:

1. A sintered sliding material consisting of from 1 to 10% by weight of graphite, from 0.1 to 7% by weight of alumina, and balance of copper as a matrix, characterized in that the alumina is dispersed in the copper matrix.

2. A sintered sliding material according to claim 1, wherein said alumina is held by the copper matrix so that said alumina is not separated from said sintered sliding material during sliding under a boundary lubricating condition.

3. A sintered sliding material according to claim 2, wherein at least 90% by weight of said copper consists of electrolytically deposited powder.

4. A sintered sliding material according to claim 1, wherein said alumina is coated with metal.

5. A sintered sliding material according to claim 4, wherein said metal is nickel.

6. A sintered sliding material according to claim 2, wherein said graphite is filled in boundaries of the copper particles in such a manner that vacancies are not formed in said boundaries.

7. A sintered sliding material according to any one of claims 2, 3, 4, or 6, wherein said graphite is impregnated with lubricating oil.

8. A sintered sliding material according to claim 7, wherein amount of said lubricating oil approximately 5% by weight or less.

9. A sintered sliding material consisting of from 1.0 to 10% by weight of graphite, from 1 to 7% by weight of alumina, at least one member selected from the group consisting of from 1 to 10% by weight of Sn and from 1 to 30% by weight of Pb, and balance of copper as a matrix, characterized in that the alumina is dispersed in the copper matrix.

10. A sintered sliding material according to claim 9, wherein said alumina is held by the copper matrix so that said alumina is not separated from said sintered sliding material during sliding under a boundary lubricating condition.

11. A sintered sliding material according to claim 10, wherein at least 90% by weight of said copper consists of electrolytically deposited powder.

12. A sintered sliding material according to claim 9, wherein said alumina is coated with metal.

13. A sintered sliding material according to claim 12, wherein said metal is nickel.

14. A sintered sliding material according to claim 10, wherein said graphite is filled in boundaries of the copper particles in such a manner that vacancies are not formed in said boundaries.

15. A sintered sliding material according to any one of claims 10, 11, 12, or 14, wherein said graphite is impregnated with lubricating oil.

16. A sintered sliding material according to claim 15, wherein amount of said lubricating oil approximately 5% by weight or less.

17. A sintered sliding material consisting of from 1 to 10% by weight of graphite, from 0.1 to 7% by weight of alumina, at least one member selected from the group consisting of from 1 to 10% by weight of Sn and from 1 to 30% by weight of Pb, not more than 1% by weight of P, and balance of copper as a matrix, characterized in that the alumina is dispersed in the copper matrix.

18. A sintered sliding material according to claim 17, wherein said alumina is held by the copper matrix so that said alumina is not separated from said sintered sliding material during sliding under a boundary lubricating condition.

19. A sintered sliding material according to claim 17, wherein at least 90% by weight of said copper consists of electrolytically deposited powder.

20. A sintered sliding material according to claim 17, wherein said alumina is coated with metal.

21. A sintered sliding material according to claim 20, wherein said metal is nickel.

22. A sintered sliding material according to claim 18, wherein said graphite is filled in boundaries of the copper particles in such a manner that vacancies are not formed in said boundaries.

23. A sintered sliding material according to any one of claims 20 or 22, wherein said graphite is impregnated with lubricating oil.

24. A sintered sliding material according to claim 23, wherein amount of said lubricating oil approximately 5% by weight or less.

25. A sintered sliding material consisting of from 1 to 10% by weight of graphite, from 0.1 to 7% by weight of alumina, not more than 1% by weight of P, and balance of copper as a matrix, characterized in that the alumina is dispersed in the copper matrix.

26. A sintered sliding material according to claim 25, wherein said alumina is held by the copper matrix so that said alumina is not separated from said sintered sliding material during sliding under a boundary lubricating condition.

27. A sintered sliding material according to claim 26, wherein at least 90% by weight of said copper consists of electrolytically deposited powder.

28. A sintered sliding material according to claim 27, wherein said alumina is coated with metal.

29. A sintered sliding material according to claim 28, wherein said metal is nickel.

30. A sintered sliding material according to claim 26, wherein said graphite is filled in boundaries of the copper particles in such a manner that vacancies are not formed in said boundaries.

31. A sintered sliding material according to any one of claims 26, 27, 28 or 30, wherein said graphite is impregnated with lubricating oil.

32. A sintered sliding material according to claim 31, wherein amount of said lubricating oil approximately 5% by weight or less.

33. A method for producing a sliding material comprises: an alumina-dispersing step for blending an alumina powder into copper powder and dispersing the alumina powder in the matrix of copper, thereby forming a copper-alumina blended powder; a graphite-blending step for mixing graphite powder with the copper-alumina blended powder; a spraying step for spraying the graphite-mixed powder on a substrate; and, a sintering step for sintering the mixed powder on the substrate to bond the mixed powder and substrate.

34. A method for producing a sliding material comprises: an alumina-dispersing step for blending an alumina powder into copper powder and dispersing the alumina powder in the matrix of copper, thereby forming a copper-alumina blended powder; an alloying step for blending at least one powder selected from the group consisting of tin, lead, phosphorous, and an alloy of copper with at least one of tin, lead, and phosphorous, with the copper-alumina blended powder, thereby obtaining a composite powder; graphite-blending step for mixing graphite powder with the composite powder, thereby obtaining a graphite-mixed powder; a spraying step for spraying the graphite-mixed powder on a substrate; and, a sintering step for sintering the mixed-powder on the substrate to bond the mixed powder and substrate.

* * * * *